(12) United States Patent
Wohlert et al.

(10) Patent No.: US 11,082,290 B2
(45) Date of Patent: *Aug. 3, 2021

(54) METHOD AND APPARATUS FOR OPTIMIZING A SOFTWARE DEFINED NETWORK CONFIGURATION

(71) Applicant: AT&T Intellectual Property I, L.P., Atlanta, GA (US)

(72) Inventors: Randolph Wohlert, Austin, TX (US); Jeffrey A. Aaron, Atlanta, GA (US); Mark Stockert, San Antonio, TX (US)

(73) Assignee: AT&T INTELLECTUAL PROPERTY I, L.P., At, GA (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/592,904

(22) Filed: Oct. 4, 2019

(65) Prior Publication Data
US 2020/0106665 A1 Apr. 2, 2020

Related U.S. Application Data

(63) Continuation of application No. 14/986,294, filed on Dec. 31, 2015, now Pat. No. 10,439,867.

(51) Int. Cl.
*H04L 12/24* (2006.01)
*H04L 29/08* (2006.01)

(52) U.S. Cl.
CPC .......... *H04L 41/0803* (2013.01); *H04L 67/30* (2013.01); *H04L 67/34* (2013.01)

(58) Field of Classification Search
CPC combination set(s) only.
See application file for complete search history.

(56) References Cited

U.S. PATENT DOCUMENTS 5,042,027 A 8/1991 Takase et al.
7,158,759 B2 1/2007 Hansen et al.
(Continued)

FOREIGN PATENT DOCUMENTS

EP 2753032 9/2014
WO WO 2014/035807 3/2014
WO WO 2015-103523 7/2015

OTHER PUBLICATIONS

"Software-Defined Networking: The New Norm for Networks," Open Network Foundation, bigswitch.com, Apr. 13, 2012. http://bigswitch.com/sites/default/files/sdn_resources/onf-whitepaper.pdf Discloses a software defined network which can configure, manage, secure, and optimize network resources via dynamic, automated programs.

(Continued)

*Primary Examiner* — Ario Etienne
*Assistant Examiner* — Kidest Mendaye

(57) ABSTRACT

In one example, a method and apparatus for optimizing a software defined network configuration are disclosed. In one example, the method determines a first network relative performance parameter for a current configuration of a network, based on respective weighting profiles associated with services for which the network carries data. The method then determines a second network relative performance parameter for a proposed configuration of the network, based on the respective weighting profiles associated with the services for which the network carries data. The proposed configuration is implemented in the network when the second network relative performance parameter is greater than the first network relative performance parameter.

20 Claims, 10 Drawing Sheets

(56) References Cited

U.S. PATENT DOCUMENTS

| | | | |
|---|---|---|---|
| 7,251,491 B2 | 7/2007 | Jha | |
| 7,564,925 B2 | 7/2009 | Bisson et al. | |
| 8,582,584 B2 | 11/2013 | Rieger et al. | |
| 8,891,664 B2 | 11/2014 | Kogawa et al. | |
| 8,908,556 B2 | 12/2014 | Abraham et al. | |
| 8,976,697 B2 | 3/2015 | Kalkunte | |
| 9,113,352 B2 | 8/2015 | Agarwal et al. | |
| 9,124,506 B2 | 9/2015 | Jogalekar et al. | |
| 9,325,585 B1 | 4/2016 | Wang | |
| 2003/0087645 A1 | 5/2003 | Kim et al. | |
| 2008/0114874 A1 | 5/2008 | Meir | |
| 2009/0046583 A1* | 2/2009 | Towster | H04L 43/0876 370/232 |
| 2011/0199899 A1 | 8/2011 | Lemaire et al. | |
| 2012/0176928 A1 | 7/2012 | Wallace et al. | |
| 2012/0266159 A1* | 10/2012 | Risbood | H04L 41/0266 717/177 |
| 2012/0275309 A1* | 11/2012 | Jalil | H04L 45/124 370/238 |
| 2014/0136690 A1* | 5/2014 | Jain | H04L 41/5012 709/224 |
| 2014/0164045 A1 | 6/2014 | Dasgupta | |
| 2014/0280961 A1* | 9/2014 | Martinez | H04L 41/5054 709/226 |
| 2014/0328190 A1 | 11/2014 | Lord et al. | |
| 2015/0063144 A1 | 3/2015 | Kozat | |
| 2015/0281085 A1 | 10/2015 | Phaal | |
| 2015/0333862 A1 | 11/2015 | Swinkels et al. | |
| 2016/0057061 A1* | 2/2016 | Avci | H04L 43/50 370/235 |
| 2016/0112327 A1* | 4/2016 | Morris | H04L 45/125 398/45 |
| 2016/0182329 A1 | 6/2016 | Armolavicius | |
| 2016/0212634 A1 | 7/2016 | Flanagan | |
| 2016/0218948 A1* | 7/2016 | Djukic | H04L 43/0876 |

OTHER PUBLICATIONS

Kim, Hyojoon, and Nick Feamster, "Improving Network Management with Software Defined Networking," IEEE Communications Magazine, sharecourse.com, 2013. http://www.comsoc.org/sites/default/files/webfm/Publications/Magazines/ci/ofc/014.pdf Discloses a software defined network which can perform automated functions based on control domains including network flow and status.

Slattery, Terry, "Software-Defined Network Management: What We Need," No Jitter, nojitter.com, Nov. 5, 2015. http://www.nojitter.com/post/240170874/softwaredefined-network-management-what-we-need Discloses a software defined network which automatically monitors key network metrics.

Moshref, Masoud, et al., "DREAM: dynamic resource allocation for software-defined measurement," Proceedings of the 2014 ACM conference on SIGCOMM, ACM, 2014. http://sysnet.ucsd.edu/sysnet/miscpapers/DreamSigcomm14.pdf Discloses a software defined network which dynamically adjusts network resources.

* cited by examiner

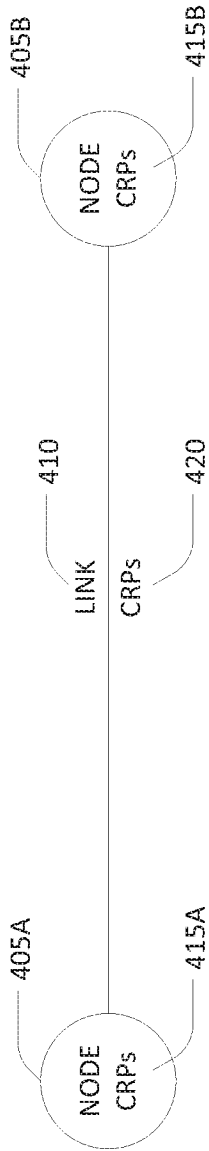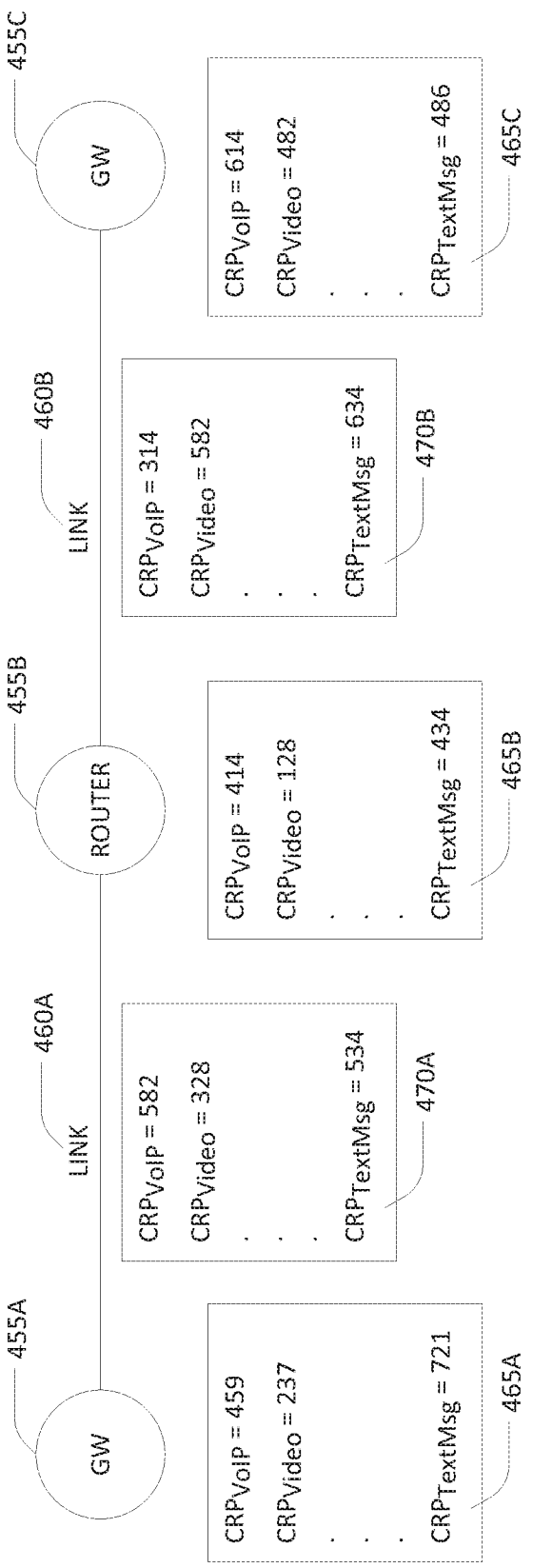

METHOD AND APPARATUS FOR OPTIMIZING A SOFTWARE DEFINED NETWORK CONFIGURATION

This application is a continuation of U.S. patent application Ser. No. 14/986,294, filed Dec. 31, 2015, now U.S. Pat. No. 10,439,867, which is herein incorporated by reference in its entirety.

The present disclosure relates to a method and apparatus for optimizing a software defined network configuration using a policy-based network performance metric.

BACKGROUND

In software defined networks (SDNs), data plane processing, which includes the physical forwarding of data between endpoints in the network, is decoupled from control plane processing, which includes making decisions concerning which routes in the SDN are to be used to forward the data between the network endpoints. The topography of an SDN may change dynamically as nodes (e.g., virtual and/or physical nodes) and/or interconnecting links (virtual and/or physical) are added and/or removed from the network.

SUMMARY OF THE DISCLOSURE

In one example, a method and apparatus for optimizing a software defined network configuration are disclosed. In one example, the method determines a first network relative performance parameter for a current configuration of a network, based on respective weighting profiles associated with services for which the network carries data. The method then determines a second network relative performance parameter for a proposed configuration of the network, based on the respective weighting profiles associated with the services for which the network carries data. The proposed configuration is implemented in the network when the second network relative performance parameter is greater than the first network relative performance parameter.

In another example, a non-transitory computer-readable storage device storing a plurality of instructions which, when executed by a processor, cause the processor to perform operations. The operations include determining a first network relative performance parameter for a current configuration of a network, based on respective weighting profiles associated with services for which the network carries data, determining a second network relative performance parameter for a proposed configuration of the network, based on the respective weighting profiles associated with the services for which the network carries data, and implementing the proposed configuration in the network when the second network relative performance parameter is greater than the first network relative performance parameter.

In another example, an apparatus includes a processor and a computer-readable storage device storing a plurality of instructions which, when executed by the processor, cause the processor to perform operations. The operations include determining a first network relative performance parameter for a current configuration of a network, based on respective weighting profiles associated with services for which the network carries data, determining a second network relative performance parameter for a proposed configuration of the network, based on the respective weighting profiles associated with the services for which the network carries data, and implementing the proposed configuration in the network when the second network relative performance parameter is greater than the first network relative performance parameter.

BRIEF DESCRIPTION OF THE DRAWINGS

The teaching of the present disclosure can be readily understood by considering the following detailed description in conjunction with the accompanying drawings, in which:

FIGS. 4A-B illustrated further examples of topology information stored in the example graph database of FIG. 1;

To facilitate understanding, identical reference numerals have been used, where possible, to designate identical elements that are common to the figures.

DETAILED DESCRIPTION

Large, complex, distributed software defined networks (SDNs) using network function virtualization (NFV) are being deployed to deliver services to customers. SDN configurations, including selection and placement of components, storage, computation facilities, and interconnections, are typically manually configured by network engineers. In addition, policies that act upon the networks' components are also typically manually defined. These policies manage the networks with a goal of optimizing the delivery of services within the constraints imposed by various parameters, including software lifecycles, operations support systems, business support systems, and applications. These manual procedures tend to be labor intensive and time consuming (e.g., not responsive in real time), and may result in less than optimal solutions due to the networks' configuration complexity.

The present disclosure broadly describes a method, a computer-readable storage device, and an apparatus for optimizing a software defined network configuration using a policy-based network performance metric. According to examples of the present disclosure, an application allows a network, such as a software defined network, to self-optimize by identifying potential incremental changes to its configuration and estimating the effects of the potential incremental changes on overall network performance. In one example, the potential effects of a proposed incremental change are estimated as a metric, referred to as a "relative network performance metric," that can be compared to a similar metric estimated for a current configuration of the network. If a potential incremental change results in an improvement in the metric, then the potential incremental change is deployed. In one example, potential incremental changes are identified and evaluated periodically or dynamically in response to changing network conditions not including service failures.

Examples of the present disclosure balance the requirements of various services that are supported by the network (i.e., services for which the network carries data) in order to determine the configuration that supports all services in the most optimal manner. For instance, the requirements (e.g., rules, policies, etc.) for traffic routing behavior may vary depending on the service for which the traffic is being routed. For example, voice, video, messaging, data transfer, and other new and innovative services may have different traffic routing requirements or other requirements.

Figure 1:
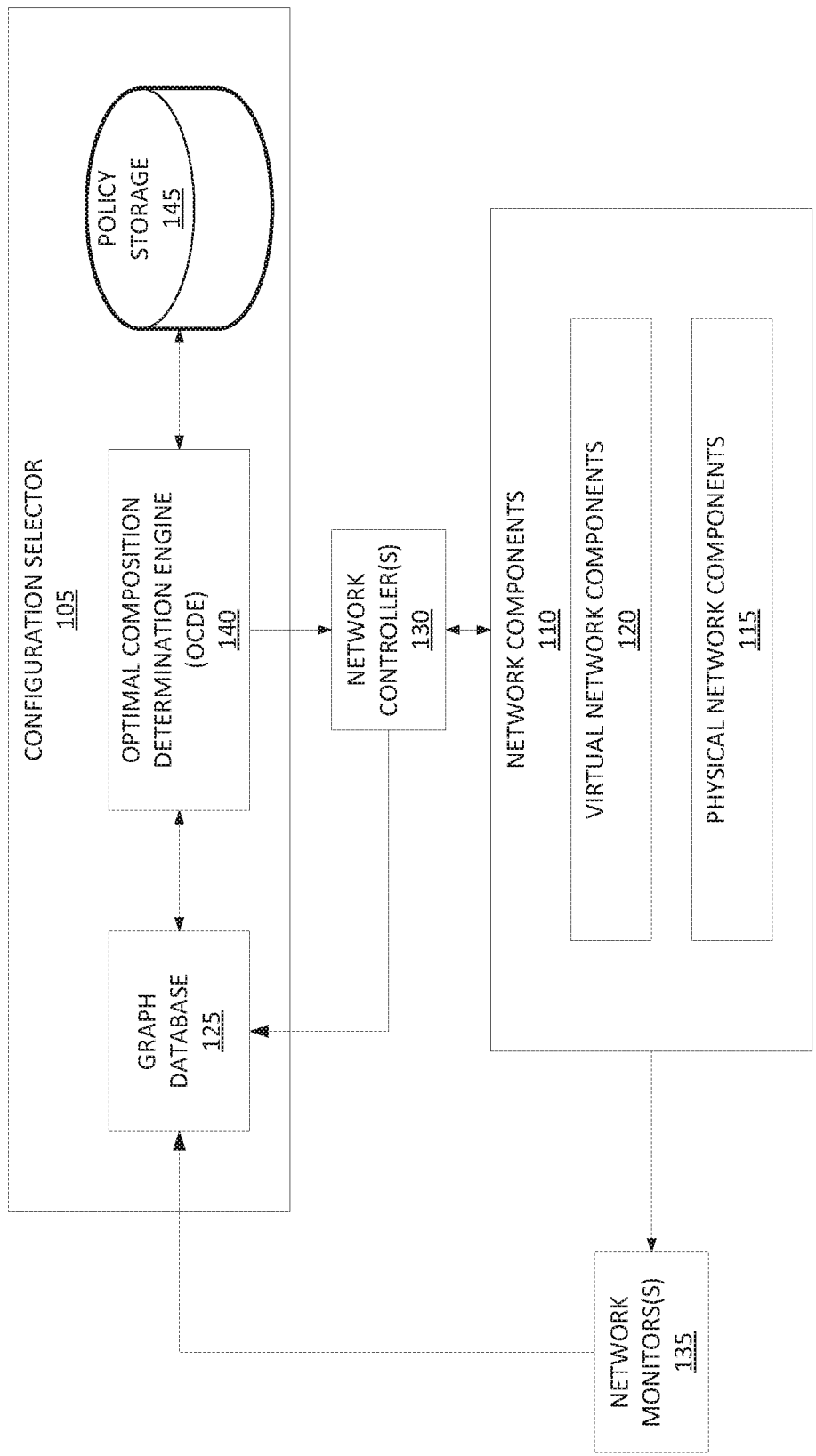
FIG. 1 illustrates a block diagram of an example communication network including an example configuration selector to determine an optimal network configuration in accordance with the teachings of this disclosure.

FIG. 1 illustrates a block diagram of an example communication network 100 including an example configuration selector 105 to determine an optimal network configuration in accordance with the teachings of this disclosure. The example communication network 100 of FIG. 1 includes example network components 110 forming a network topology capable of routing traffic (e.g., packets, flows, etc.) between endpoints of the network 100. The example network components 110 include network nodes and network links interconnecting the nodes. For example, the nodes in the example network components 110 may include, but are not limited to, switches, routers, gateways, etc., or any combination thereof. The links in the example network components 110 may include, but are not limited to, dedicated links, shared links, optical links, wireless links, etc., or any combination thereof. Furthermore, the network nodes in the example network components 110 may be physical nodes and/or virtual nodes, and the network links in the example network components 110 may be physical links and/or virtual links. Accordingly, the example network components 110 include example physical network components 115 and/or example virtual network components 120.

In the illustrated example of FIG. 1, the configuration selector 105 includes an example graph database 125 to store network topology information representing the arrangement(s) of the network components 110 in the example network 100. The example graph database 125 utilizes graph nodes, graph edges and properties to represent and store data. Elements in the graph database 125 contain pointers to adjacent elements to avoid the need for the index lookups associated with conventional relational databases. For example, the nodes in the network components 110 can be represented in the graph database 125 with graph nodes and associated properties, the links in the network components 110 can be represented in the graph database 125 with graph edges and associated properties, and the interconnections of the nodes and links of the network components 110 can be represented in the graph database 125 using pointers between the appropriate graph nodes and graph edges.

The network topology information stored by the graph database 125 includes information specifying the components 110 (e.g., nodes, links, etc.) included in the network, the arrangement (e.g., interconnections) of the components 110, performance measurements (e.g., delay, jitter, path loss, bandwidth, reliability, etc.) for the different components 110, etc. In some examples, the graph database 125 receives the network topology information from one or more example network controllers 130, such as one or more SDN controllers 130, responsible for (i) managing the addition and removal of network components 110 to/from the network 100, (ii) downloading routing information to the network components, and (iii) monitoring the performance of the network components 110. In some examples, the performance measurements stored in the graph database 125 for respective ones of the example network components 110 can additionally or alternatively be obtained by one or more example network monitor(s) 135, such as one or more network taps, traffic monitors, etc. In some examples, the network controller(s) 130 and/or the network monitor(s) 135 query respective ones of the example network components 110 for status information including performance measurements (e.g., delay, jitter, path loss, bandwidth, reliability, etc.), utilization measurements (e.g., capacity, power consumption, etc.), for the network components 110. In some examples, the set of performance measurements obtained for a given network component are stored in the graph database 125 with the topology information describing the given network component.

The example configuration selector 105 of FIG. 1 also includes an example optimal composition determination engine (OCDE) 140 to evaluate and select potential configurations for the network 100. A configuration corresponds to an arrangement of nodes and links in the network components 110 via which traffic corresponding to various services can be routed in the network 100. In the illustrated example of FIG. 1, the OCDE 140 utilizes the topology information stored in the example graph database 125 and policies specifying rules to be obeyed when evaluating different proposed configurations.

Accordingly, the example configuration selector 105 of FIG. 1 further includes an example policy storage 145 to store policies. The policies may include rules that guide evaluation of proposed configurations. In one example, policies are specified according to one or more policy specification methods, such as the yet another next generation (YANG) or topology and orchestration specification for cloud applications (TOSCA) data modeling languages and/or other conditional rules. The policies may further include engineering rules (e.g., various simple operational constraints and relationships codified directly into rules). Policy specification information may include one or more of: (1) relative importance of services (e.g., relative weights) for services, for different parts of the network (e.g., local, regional, or national), across the entire global network, for specific customers or types of customers (e.g., government, emergency, enterprise, or consumer); (2) constraints required (e.g., technical, legal, or regulatory constraints); (3) goals to be met (e.g., related to service quality, latency maximums, reliability, etc.). Policies may also provide the ability to quickly change, update, or correct aspects of the methods used for determining network configurations. For instance, policies may specify conditional rules used to dynamically determine a particular pre-defined method used to determine proposed network configuration changes (e.g., for conditions A in a portion of the network, use method 1 to propose changes there; otherwise, use method 2). This will allow many methods for proposing network configuration changes to be utilized simultaneously (e.g., different methods in different portions of the network) and continuously (e.g., in an on-going sequence as conditions change locally and/or globally). Policies may also specify conditional rules for updating priorities, such as to settle conflicts when multiple proposed changes together would violate a constraint policy (e.g., such that a single "winner" must be selected), to dynamically adjust weights associated with various services, and to adjust the priorities of various types of improvements or optimizations (e.g., locally or globally). The example policy storage 145 may be implemented by any number(s) and/or type(s) of volatile and/or non-volatile memory, storage, etc., or combination(s) thereof, such as the example volatile memory 808 and/or the example mass storage device(s) 812 included in the example of FIG. 8.

As disclosed in further detail below, the example OCDE 140 continuously determines the optimal network configuration by (i) introducing proposed network configuration changes to be simulated by a virtual network model of the network 100, including changes to arrangements of the network components 110; and (ii) determining performance parameters for the proposed network configuration. If the performance parameters are improved, then the OCDE may deploy the proposed network configuration changes, e.g., using existing control/orchestration functions. For example, and as disclosed in further detail below, the OCDE 140 may determine, for a given network configuration, a performance parameter (e.g., corresponding to a component relative performance parameter, which is disclosed in further detail below) for a given one of the network components 110 by processing the performance measurements stored in the graph database 125 for the given one of the network components 110 based on a weighting profile stored in the policy storage 145 for that service. As also disclosed in further detail below, the OCDE 140 may determine respective performance parameters (e.g., corresponding to path relative performance parameters, which are disclosed in further detail below) for respective candidate paths in the network 100 by combining the performance parameters (e.g., the component relative performance parameters) determined for those network components 110 included in the respective candidate paths. The example OCDE 140 may then determine a performance parameter (e.g., corresponding to a network service relative performance parameter) for each service supported by the network 100 by combining the performance parameters (e.g., the path relative performance parameters) determined for the service. The example OCDE 140 may then determine a performance parameter (e.g., corresponding to network relative performance parameters) for the network 100 by combining the performance parameters (e.g., the network service relative performance parameters) determined for the individual services. Finally, the example OCDE 140 may select a network configuration (e.g., a current network configuration or a proposed network configuration) based on comparing the performance parameters (e.g., the network relative performance parameters) determined for different network configurations.

After selecting a network configuration, the example OCDE 140 transmits configuration information descriptive of the configuration to the network controller(s) 130. The network controller(s) 130, in turn, transmit the configuration information to the appropriate network components 110 to deploy the selected network configuration. For example, the configuration information may be transmitted to the network components 110 between which a new link is to be established.

Although the example configuration selector 105 of FIG. 1 is depicted as being separate from the example network controller(s) 130, in some examples, the example configuration selector 105 is implemented by one or more of the network controller(s) 130. Also, although the example configuration selector 105 of FIG. 1 is described in the context of the example network 100 being an SDN, configuration selection as disclosed herein is not limited thereto. For example, the example configuration selector 105 can be utilized to perform configuration selection in any network in which information describing the network components is available.

Figure 2:
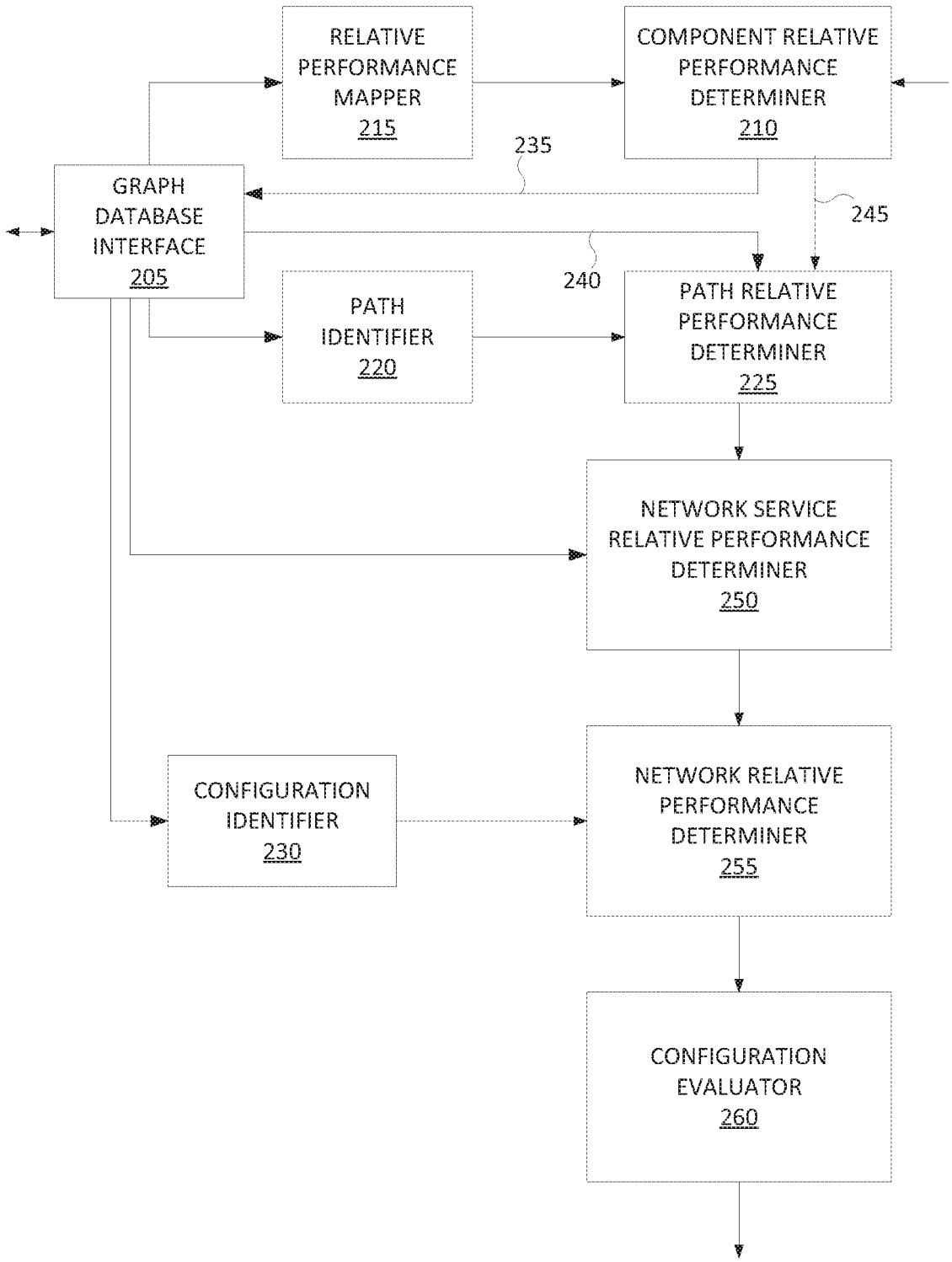
FIG. 2 illustrates a block diagram of an example implementation of the optimal composition determination engine of FIG. 1.

FIG. 2 illustrates a block diagram of an example implementation of the OCDE 140 of FIG. 1. The example OCDE 140 of FIG. 2 includes an example graph database interface 205 to interface the OCDE 140 with a graph database, such as the example graph database 125 of FIG. 1. For example, the graph database interface 205 is structured to send queries to the graph database 125 to retrieve, for example, sets of performance measurements for the example network components 110, sets of paths for routing traffic between pairs of endpoints in the network 100, etc. The example graph database interface 205 can be implemented by any type(s), number(s) and/or combination(s) of interfaces, such as the example interface circuit 816 of FIG. 8, which is described in further detail below.

The example OCDE 140 of FIG. 1 also includes an example component relative performance (CRP) determiner 210 to determine respective CRP parameters for the different network components 110 included in the network 100 (e.g., SDN). For example, for a given network component (e.g., node, link, etc.), the CRP determiner 210 determines a respective CRP parameter for each service for which traffic (e.g., packets, flows, etc.) may be routed via the network component. The CRP parameter is a single value that characterizes the relative performance of the network component for routing data associated with a given service. As such, a given network component may have different CRP parameters for different services.

In some examples, the CRP parameter determined by the example CRP determiner 210 for a given network component 110 and a given network service is a dimensionless parameter determined from the performance measurements (e.g., delay, jitter, packet loss, bandwidth, reliability, etc.) maintained in a graph database, such as the graph database 125, for the given network component. To facilitate determination of CRP parameters from combinations of measurements having different ranges of values, the example OCDE 140 of FIG. 2 includes an example relative performance mapper 215 to map, for a given network component, performance measurements (e.g., delay, jitter, packet loss, bandwidth, reliability, etc.), which may have different respective ranges of values, to corresponding mapped performance parameters, which have a common range of values. The mapping for a given performance measurement may be linear or nonlinear depending on the possible range of values for the given performance measurement. The mapping may be implemented by look-up tables, normalization functions (e.g., that normalize a range of inputs to a range of normalized outputs), etc.

For example, if the possible packet delay for a given network component lies in the range of 2 milliseconds (ms.) (best case) to 40 ms. (worst case), the relative performance mapper 215 may employ a linear mapping to map a measured delay for the given network component to mapped delay parameter that is a dimensionless number in the range of 100 (best case, corresponding to 2 ms.) to 1 (worst case, corresponding to 40 ms.). In such an example, a measured delay of 3 ms. for a network component (e.g., a link) may map to a mapped delay parameter of, for example, 97. As another example, if the possible packet loss for a given network component lies in the range of $10^{-2}$ (worst case) to $10^{-6}$ (best case), the relative performance mapper 215 may employ a nonlinear (e.g., logarithmic) mapping to map measured packet loss for the given network component to a mapped packet loss parameter that is a dimensionless number in the range of 100 (best case, corresponding to $10^{-6}$) to 1 (worst case, corresponding to $10^{-2}$). In such an example, a measured packet loss of $10^{-4}$ for a network component (e.g., a link) may map to a mapped packet loss parameter of, for example, 50. In some examples, although the different performance measurements for a given network component may have different ranges and dimensions, the corresponding mapped performance parameters for these different performance measurements are dimensionless and have the same ranges (e.g., from 1, which is worst case, to 100, which is best case, or some other range).

In the illustrated example of FIG. 2, the example CRP determiner 210 uses the mapped performance parameters determined by the relative performance mapper 215 for a given network component 110 to determine a particular CRP parameter for a particular service supported by the network component 110. In some examples, for a given network component 110, the example CRP determiner 210 determines the particular CRP parameter for a particular service by weighting the mapped performance parameters for the network component 110 based on weights tailored to the particular service, and then combining (e.g., summing, multiplying, etc.) the weighted, mapped performance parameters to determine the CRP parameter for the particular service. Because different performance characteristics may have different degrees of importance for different services, the example CRP determiner 210 may use different weightings of the mapped performance parameters for a given network component 110 to determine the network component's respective CRP parameters for different services. In the illustrated example of FIG. 2, the CRP determiner 210 obtains the weights to be applied to the mapped performance parameters of a given network components 110 to determine the network component's respective CRP parameters for different services from the weighting profiles stored in the example policy storage 145 for the different services.

For example, Table 1 illustrates example performance characteristics, such as packet delay requirements, packet loss requirements, etc., for different example services, such as voice over Internet protocol (VoIP) calls, video calls, online gaming, video streaming, Internet protocol multimedia subsystem (IMS) signaling, transmission control protocol (TCP) services, etc. The example services listed in Table 1 correspond to the 3rd Generation Partnership Project (3GPP) quality of service (QoS) class identifiers (QCIs) and priorities also listed in the table. The example services listed in Table 1 can generally be classified into two service types, namely, real-time (RT) services and non-real-time (NRT) services. RT services are typically characterized by short response times between communicating endpoints and guaranteed bit rate (GBR) requirements. RT services also typically have strict requirements regarding packet delay and jitter. VoIP is an example of an RT service.

NRT services typically do not have tight requirements concerning packet delay, although high packet delays may be unacceptable. Therefore NRT services are usually non-GBR services. For NRT services, information integrity is often an important requirement and, as such, NRT services may have low tolerance for packet loss. Web browsing is an example of an NRT service.

TABLE 1

| QCI | Bearer Type | Priority | Packet Delay | Packet Loss | Example |
|-----|-------------|----------|--------------|-------------|---------|
| 1   | GBR         | 2        | 100 ms       | $10^{-2}$   | VoIP call |
| 2   |             | 4        | 150 ms       | $10^{-3}$   | Video call |
| 3   |             | 3        | 50 ms        |             | Online Gaming (Real Time) |
| 4   |             | 5        | 300 ms       | $10^{-6}$   | Video streaming |
| 5   | Non-GBR     | 1        | 100 ms       |             | IMS Signaling |
| 6   |             | 6        | 300 ms       |             | Video, TCP based services e.g. email, chat, ftp etc |
| 7   |             | 7        | 100 ms       | $10^{-3}$   | Voice, Video, Interactive gaming |
| 8   |             | 8        | 300 ms       | $10^{-6}$   | Video, TCP based services e.g. email, chat, ftp etc |
| 9   |             | 9        |              |             |  |

Based on the example of Table 1, delay and jitter may be important performance parameters for a voice service, whereas packet loss may be an important performance parameter for a video service. Thus, in such an example, the CRP determiner 210 may apply larger weights to the relative delay and jitter measurements (after being mapped by the relative performance mapper 215, as disclosed above) and a smaller weight to the relative packet loss measurement (after being mapped by the relative performance mapper 215, as disclosed above) when determining, for a given network node, the CRP parameter corresponding to voice service traffic. Conversely, in such an example, the CRP determiner 210 may apply smaller weights to the relative delay and jitter measurements (after being mapped by the relative performance mapper 215, as disclosed above) and a larger weight to the relative packet loss measurement (after being mapped by the relative performance mapper 215, as disclosed above) when determining, for the given network node, the CRP parameter corresponding to video service traffic.

Stated mathematically, the example CRP determiner 210 determines, for respective ones of the network components 110 (e.g., nodes, links, etc.) in the network 100, a set of CRPs, with each CRP in the set of CRPs corresponding to a respective service from a set of possible services for which traffic may be routed via the network component 110. The CRP for a specific network component 110 and a specific service is represented by $CRP_{n,s}$, where n={1, ..., N} indexes over the different network components 110, and s={1, ..., S} indexes over the different possible services. The CRP determiner 210 of the illustrated example determines $CRP_{n,s}$ for a given network component, n, and a given service, s, as a summation of weighted, mapped performance parameters, $MP_{n,p}$, for the network component, n, according to Equation 1, which is:

$$CRP_{n,s} = \sum_{p=1}^{P} W_{s,p} \times MP_{n,p}$$

Equation 1

In Equation 1, $MP_{n,p}$ represents the set of $p=\{1, \ldots, P\}$ mapped performance parameters determined by the relative performance mapper 215 for the given network component, n, and $W_{s,p}$ represents the set of $p=\{1, \ldots, P\}$ weights specified for a given service, s.

As disclosed above, the relative performance mapper 215 maps (e.g., normalizes) a set of performance measurements, denoted $PM_{n,p}$, $p=\{1, \ldots, P\}$, for a given network component, n, to a corresponding set of mapped performance parameters $MP_{n,p}$, $p=\{1, \ldots, P\}$. For example, the set of performance measurements, $PM_{n,p}$, for a given network component, n, may include a set of P=3 measurements, which include measured packet loss ($PM_{n,1}$), measured delay ($PM_{n,2}$) and a measured jitter ($PM_{n,3}$) for the network component. The relative performance mapper 215 of the illustrated example maps this set performance measurements, $PM_{n,p}$, to a corresponding set of P=3 mapped performance parameters, $MP_{n,p}$, which include a mapped packet loss parameter ($MP_{n,1}$), a mapped delay parameter ($MP_{n,2}$) and a mapped jitter parameter ($MP_{n,3}$) for the network component, n.

As disclosed above, the CRP determiner 210 of the illustrated example obtains the set of weights, $W_{s,p}$, for each service, s, from a weighting profile specified for the service and stored in the example policy storage 145. For example, the weighting profile for a given service, s, may specify a first weight ($W_{s,1}$) to be applied to mapped packet loss parameters ($MP_{n,1}$), a second weight ($W_{s,2}$) to be applied to mapped delay parameters ($MP_{n,2}$) and a third weight ($W_{s,3}$) to be applied to mapped jitter parameters ($MP_{n,3}$). In some examples, the weights, $W_{s,p}$, have a range of values (e.g., such as a range from 1 to 10, a range from 1 to 100, etc.), with higher weights being assigned to more important performance parameters. For example, for a video service (e.g., indexed by s=1), the weighting profile for the video service may specify $W_{1,1}=90$ as the weight to be applied to mapped packet loss parameters ($MP_{n,1}$), $W_{1,2}=70$ as the weight to be applied to mapped delay parameters ($MP_{n,2}$) and $W_{1,3}=60$ as the weight to be applied to mapped jitter parameters ($MP_{n,3}$) (e.g., because, for this video service, packet loss may be more important than delay, which may be more important than jitter). As another example, for a VoIP service (e.g., indexed by s=2), the weighting profile for the VoIP service may specify $W_{2,1}=50$ as the weight to be applied to mapped packet loss parameters ($MP_{n,1}$), $W_{2,2}=95$ as the weight to be applied to mapped delay parameters $MP_{n,2}$) and $W_{2,3}=75$ as the weight to be applied to mapped jitter parameters ($MP_{n,3}$) (e.g., because, for this VoIP service, delay may be more important than jitter, which may be more important than packet loss). In some examples, the weighting profiles containing the sets of weights, $W_{s,p}$, for the respective services, s, are specified by a network administrator and/or other user, and may be updated as service requirements change, as new services are added, as existing services are deleted, etc.

The example OCDE 140 of FIG. 2 also uses the service-specific CRP parameters determined by the example CRP determiner 210 for the different network components 110 of the network 100 to identify paths to route packets for given services from given ingress endpoints (e.g., ingress nodes) to given egress endpoints (e.g., egress nodes) of the network 100. In the illustrated example of FIG. 2, to identify a path to route packets for a given service from a particular ingress endpoint to a particular egress endpoint, the OCDE 140 includes an example path identifier 220 to query, via the graph database interface 205, a graph database, such as the graph database 125, to obtain a set of candidate paths that includes some or all of the possible paths for routing traffic (e.g., packets, flows, etc.) between the ingress endpoint to the egress endpoint. In some examples, the path identifier 220 performs one or more pre-selection/filtering operations to reduce the set of possible paths returned by the graph database 125 for routing traffic (e.g., packets, flows, etc.) between the ingress endpoint to the egress endpoint to a more manageable set of candidate paths. For example, the path identifier 220 may exclude possible path(s) from the set of candidate paths that include a number of hops that exceeds a first threshold number, include a number of network components (e.g., nodes and/or links) that exceed a second threshold number, etc.

To characterize the relative performance of the different candidate paths for routing traffic for different services, the example OCDE 140 of FIG. 2 includes an example path relative performance (PRP) parameter determiner 225. In the illustrated example of FIG. 2, the PRP determiner 225 determines a respective PRP parameter for each one of the set of candidate paths identified by the path identifier 220 for routing traffic between a given pair of endpoints for a particular service. If the same candidate path is identified for routing traffic for multiple, different services between the same pair of network endpoints, the PRP determiner 225 of the illustrated example determines respective PRP parameters for each different service. In some examples, the PRP determiner 225 determines a PRP parameter for a particular candidate path and a particular service by combining (e.g., summing, multiplying, etc.) the particular service's CRP parameters determined by the example CRP determiner 210 for each network component 110 included in the candidate path.

Stated mathematically, the example PRP determiner 225 determines a set of PRPs for a set of candidate paths, or routes, for routing traffic (e.g., packets, flows, etc.) for a specific service between a pair of endpoints in the network 100. Each PRP in the set of PRPs corresponds to a respective one of the set of candidate paths. The PRP for a specific candidate path and a specific service is represented by $PRP_{r,s}$, where $r=\{1, \ldots, R\}$ indexes over the different candidate paths in the set of candidate paths identified between the pair of endpoints, and $s=\{1, \ldots, S\}$ indexes over the different possible services. The PRP determiner 225 of the illustrated example determines the PRP parameter, $PRP_{r,s}$, for a given candidate path, r, and a given service, s, as a summation of the CRP parameters, $CRP_{n,s}$, of the network components included in the candidate path, r, according to Equation 2, which is:

$$PRP_{r,s} = \sum_{n=1}^{N_r} CRP_{n,s} \qquad \text{Equation 2}$$

In Equation 2, the summation is over the $N_r$ network components included in the candidate path, r. (Different candidate paths will generally include one or more different network components.) As illustrated by Equation 2, the example PRP determiner 225 may determine, for a given candidate path, r, different PRP parameters, $PRP_{r,s}$, for different services. For example, for a given candidate path, r, the PRP determiner 225 may determine a first PRP parameter ($PRP_{r,1}$) for a video service (e.g., indexed by s=1) and a second PRP parameter ($PRP_{r,2}$) for a VoIP service (e.g., indexed by s=2).

To characterize the relative performance of the different services supported by the network 100, the example OCDE 140 of FIG. 2 includes an example network service relative performance (NSRP) parameter determiner 250. In the illustrated example of FIG. 2, the NSRP determiner 250 determines a respective NSRP parameter for each one of the services supported by the network. In some examples, the NSRP determiner 250 determines an NSRP parameter for a particular service by combining (e.g., summing, multiplying, etc.) the particular service's PRP parameters determined by the example PRP determiner 225 for each candidate path utilized by the service to route traffic.

Stated mathematically, the example NSRP determiner 250 determines a NSRP for a specific service supported by the network 100. The NSRP for a specific service is represented by $NSRP_s$, where $s=\{1, \ldots, S\}$ indexes over the different possible services. The NSRP determiner 250 of the illustrated example determines the NSRP parameter, $NSRP_s$, for a given service, s, as a summation of the PRP parameters, $PRP_{r,1}$ through $PRP_{r,n}$, of the candidate paths used by the service, s, to route traffic according to Equation 3, which is:

$$NSRP_s = \sum_{r=1}^{R} PRP_{r,s} \qquad \text{Equation 3}$$

In Equation 3, the summation is over the R candidate paths used by the service, s.

To characterize the relative performance of a proposed configuration for network 100, the example OCDE 140 of FIG. 2 includes an example network relative performance (NRP) parameter determiner 255. In the illustrated example of FIG. 2, the NRP determiner 255 determines a respective NRP parameter for each proposed configuration for the network. In some examples, the NRP determiner 255 determines an NRP parameter for a particular configuration by combining (e.g., summing, multiplying, etc.) the particular configuration's NSRP parameters determined by the example NSRP determiner 250. The NSRP parameters may be weighted according to weights for all services, e.g., as specified by one or more policies in the policy storage 145.

Stated mathematically, the example NRP determiner 255 determines an NRP for a specific configuration of the network 100. The NRP for a specific configuration is represented by NRP. The NSP determiner 255 of the illustrated example determines the NRP parameter, NRP, for a given configuration of the network as a summation of the NSRP parameters according to Equation 4, which is:

$$NRP = \sum_{k=1}^{n} W_{s,k} \times NSRP_{s,k} \qquad \text{Equation 4}$$

In the illustrated example of FIG. 2, to identify a proposed configuration for a network, the OCDE 140 includes an example configuration identifier 230 to query, via the graph database interface 205, a graph database, such as the graph database 125, to obtain a proposed configuration for the network. The example configuration identifier 230 may further comprise functionality for constructing a virtual network model of the network 100. The virtual network model may be used to simulation operation of the network 100 under various configurations, including the proposed configuration, in real time. In one example, the proposed configuration represents an incremental change over a current configuration of the network.

The example RCDE 140 of FIG. 2 further includes an example configuration evaluator 260 to evaluate the NRP parameters determined for a proposed configuration and a current configuration and to select a configuration for the network 100. In some examples, the configuration evaluator 260 selects the configuration with the best (e.g., highest) NRP parameter.

In the illustrated example of FIG. 2, the configuration evaluator 260 transmits configuration information describing the arrangement of nodes and links for different configurations of the network 100 to one or more network controllers, such as the network controller(s) 130. The network controller(s) 130, in turn, transmit this configuration information to the appropriate network components 110, which, for example, update their respective connections to establish new links in the network 100 according to the selected configuration.

As disclosed above, in some examples, the example NRP determiner 255 indirectly uses the sets of CRP parameters determined by the example CRP determiner 210 for the respective network components 110 in the network 100 to determine the NRP parameters for proposed network configurations. In some examples, the CRP determiner 210 stores the sets of CRP parameters determined for the respective network components 110 in the graph database 125 for subsequent retrieval by the PRP determiner 225 (which is represented by solid lines 235 and 240 in the illustrated example of FIG. 2). For example, the CRP determiner 210 may use the graph database interface 205 to store a set of CRP parameters determined for a given network component 110 with the topology information maintained by the graph database 125 for that network component. In some such examples, the PRP determiner 225 may use the graph database interface 205 to query the graph database 125 to retrieve the sets of CRP parameters for the network components 110 included in the candidate paths identified by the example path identifier 220.

Additionally or alternatively, in some examples, the CRP determiner 210 determines the sets of CRP parameters for given network components 110 as they are needed by the PRP determiner 225 for determining PRP parameters (which is represented by a dashed line 245 in the illustrated example of FIG. 2). For example, the CRP determiner 210 may determine the sets of CRP parameters for those network components 110 included in the candidate paths identified by the example path identifier 220, and then provide the determined sets of CRP parameters to the PRP determiner 225 for use in determining the respective PRP parameters for the candidate paths.

Figure 3:
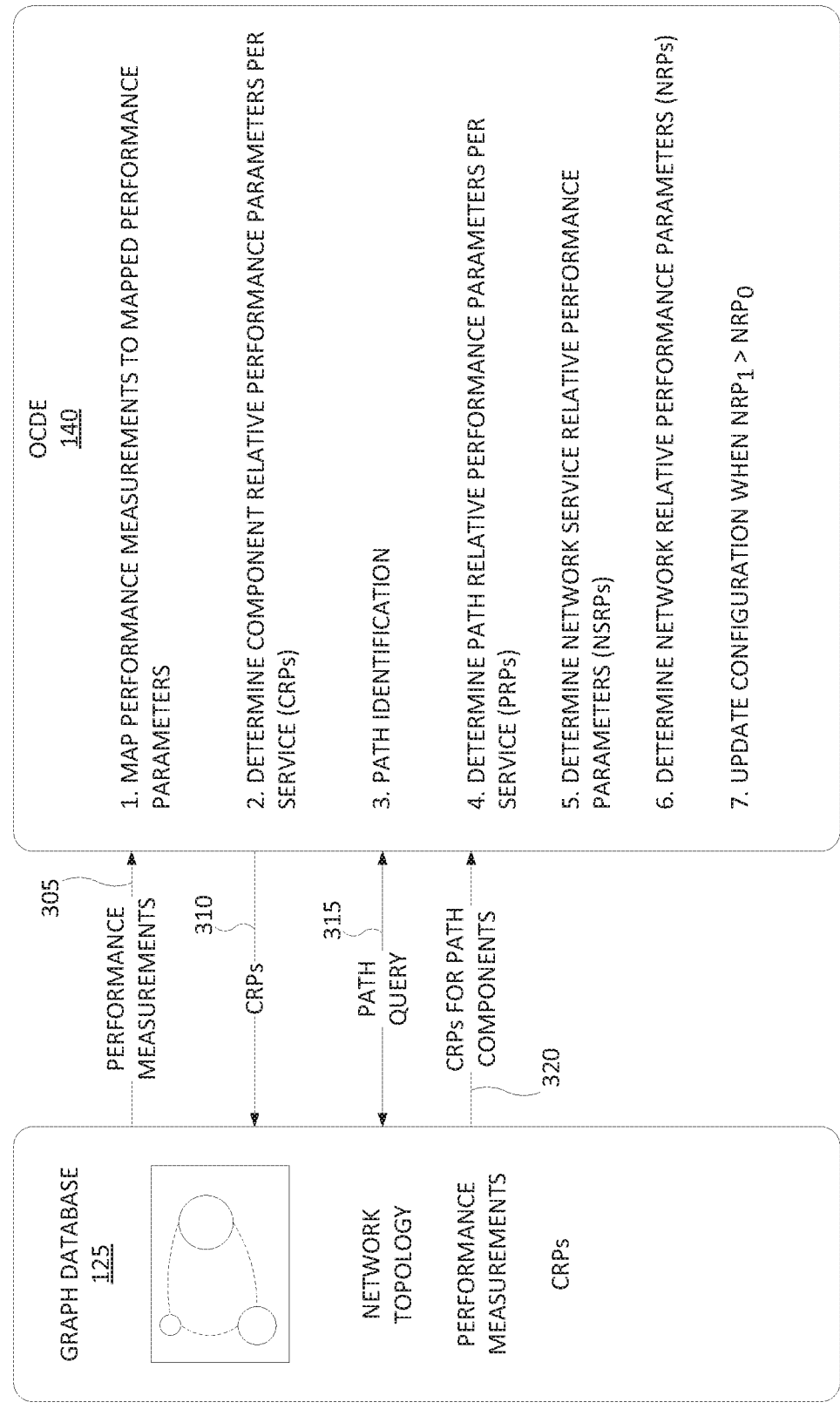
FIG. 3 is a block diagram illustrating example information exchanged between the example optimal composition determination engine and the example graph database of the example configuration selector of FIG. 1.

FIG. 3 is a block diagram 300 illustrating example information exchanged between the example OCDE 140 and the example graph database 125 of the example configuration selector 105 of FIG. 1. In some examples, the graph database interface 205 is used to exchange the information illustrated in FIG. 3. As illustrated in the example block diagram 300 of FIG. 3, the example graph database 125 stores network topology information for the network components 110 included in the network 100. Such network topology information can include, but is not limited to, information describing the nodes and links included in the network 100, their respective characteristics (e.g., such as capacities, bandwidths, etc.) and their arrangement in the network 100 (e.g., such as the interconnections between the nodes and links). The example graph database 125 of FIG. 3 also stores respective sets of performance measurements (e.g., delay, jitter, path loss, bandwidth, reliability, etc.) for the network components 110 represented by the stored topology information. Furthermore, in some examples, the graph database 125 stores respective sets of service-specific CRP parameters determined, as described above, by the example OCDE 140 for the network components 110 represented by the stored topology information.

In the example of FIG. 3, the OCDE 140 uses the example graph database interface 205 to query 305 the graph database 125 to retrieve the sets of performance measurements for the network components 110 represented by the topology information stored in the graph database 125. As disclosed above, the OCDE 140 then (1) maps the retrieved sets of performance measurements to respective sets of mapped performance parameters, and (2) uses the sets of mapped performance parameters to determine respective sets of CRP parameters for the network components 110 (e.g., with a given network component 110 potentially having a different CRP parameter for each different supported service). In the example of FIG. 3, the OCDE 140 uses the example graph database interface 205 to store 310 the respective sets of CRP parameters determined for the respective network components 110 in the graph database 125. For example, the graph database interface 205 may include a set of CRP parameters for a given network component with the topology information for that network component.

As illustrated in the example of FIG. 3, the OCDE 140 also uses the example graph database interface 205 to (3) perform path identification by executing example path queries 315 of the graph database 125 to identify sets of possible paths (e.g., candidate paths) for routing traffic for given services between given pairs of network endpoints. For example, the graph database 125 may employ any appropriate search techniques, pattern matching techniques, graph traversal techniques, etc., to discover possible paths between pairs of endpoints included in the stored topology information. As disclosed above, the OCDE 140 then uses the example graph database interface 205 to query 320 the graph database 125 for the sets of CRP parameters of the network components 110 included in the sets of candidate paths. As disclosed above, the OCDE 140 uses the retrieved sets of CRP parameters to (4) determine respective, service-specific PRP parameters for the candidate paths. As further disclosed above, the OCDE 140 uses the service-specific PRP parameters to determine NSRP parameters for each service. The OCDE 140 then uses the NSRP parameters, along with respective weights for the NSRP parameters, to determine an NRP parameter for a proposed network configuration. If the NRP of the proposed network configuration, $NRP_1$, is greater than the NRP of the current configuration, $NRP_0$, then the OCDE 140 deploys the proposed network configuration.

FIGS. 4A-B illustrated further examples of topology information 400 and 450 stored in the example graph database 125 of FIG. 1. In the illustrated example of FIG. 4A, the topology information 400 includes information describing example nodes 405A-B and an example link 410. The example topology information 400 also specifies the arrangement (e.g., interconnections) of the example nodes 405A-B and the example link 410. The example topology information 400 further includes example sets of CRPs 415A-B and 420 determined by the example OCDE 140 for the example nodes 405A-B and the example link 410, respectively.

In the illustrated example of FIG. 4B, the topology information 450 includes information describing example nodes 455A-C (e.g., which may be gateways, routers, etc.) and example links 460A-B. The example topology information 450 also specifies the arrangement (e.g., interconnections) of the example nodes 455A-C and the example links 460A-B. The example topology information 450 further includes example sets of CRPs 465A-C and 470A-B determined by the example OCDE 140 for the example nodes 455A-C and the example links 460A-B, respectively. In the illustrated example of FIG. 4B, the respective sets of CRPs 465A-C and 470A-B for the example nodes 455A-C and the example links 460A-B include different CRPs for a VoIP service, a video service, a text messaging service, etc.

Figure 5A:
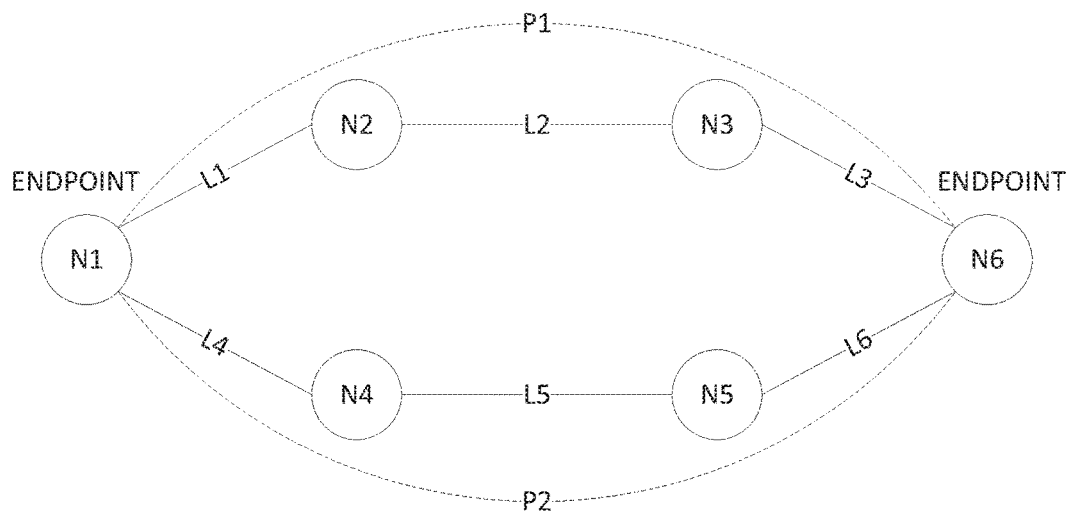
FIGS. 5A-D illustrate further example component relative performance metrics and path relative performance metrics capable of being determined by the example optimal composition determination engine of FIGS. 1-3 for different example network topologies.

FIGS. 5A-D illustrate further example CRPs and PRPs capable of being determined by the example OCDE 140 of FIGS. 1-3 for different example network topologies. FIG. 5A illustrates a first example network topology 500 including six (6) example nodes N1 through N6 interconnected by six (6) example links L1 through L6, as shown. In the illustrated example of FIG. 5A, traffic for a service is to be routed between endpoint node N1 and endpoint node N6. In response to a query from the OCDE 140, the example graph database 125 identifies two possible paths, P1 and P2, capable of routing traffic between the pair of endpoint nodes N1 and N6. As shown in the example of FIG. 5A, the path P1 includes nodes N1, N2, N3 and N6, which are interconnected by links L1, L2 and L3, as shown. The path P2 includes nodes N1, N4, N5 and N6, which are interconnected by links L4, L5 and L6, as shown.

Figure 5B:
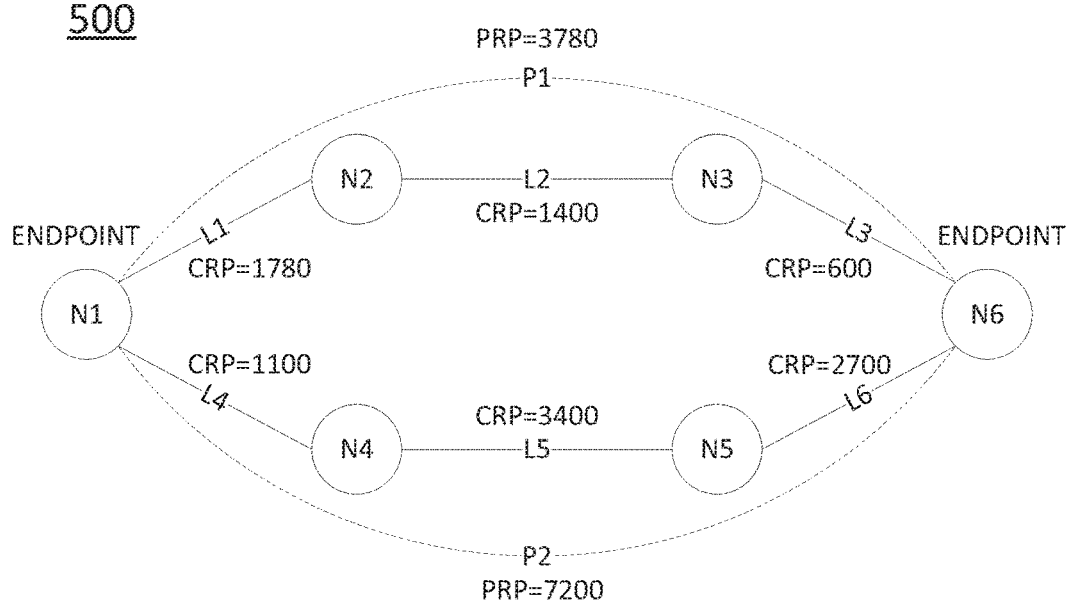

FIG. 5B illustrates example CRP parameters determined by the example OCDE 140 for the network components in the example topology 500, and example PRP parameters determined by the example OCDE 140 for the possible paths P1 and P2. In the illustrated example of FIG. 5B, the CRP parameters for the network nodes N1 through N6 are assumed to have negligible effect on the PRP parameters determined for the possible paths P1 and P2. Accordingly, the CRP parameters for the network nodes N1 through N6 are omitted in FIG. 5B for clarity.

In the example of FIG. 5B, for the service to be routed between endpoint nodes N1 and N6, the OCDE 140 determines, as disclosed above, a CRP of 1780 for link L1, a CRP of 1400 for link L2, a CRP of 600 for L3, a CRP of 1100 for link L4, a CRP of 3400 for link L5 and a CRP of 2700 for link L6. Accordingly, the OCDE 140 determines the PRP for path P1 to be the sum of the CRPs for links L1, L2 and L3, which is:

$$PRP_{P1}=1780+1400+600=3780 \qquad \text{Equation 5}$$

Similarly, the OCDE 140 determines the PRP for path P2 to be the sum of the CRPs for links L4, L5 and L6, which is:

$$PRP_{P2}1100+3400+2700=7200 \qquad \text{Equation 6}$$

Figure 5C:
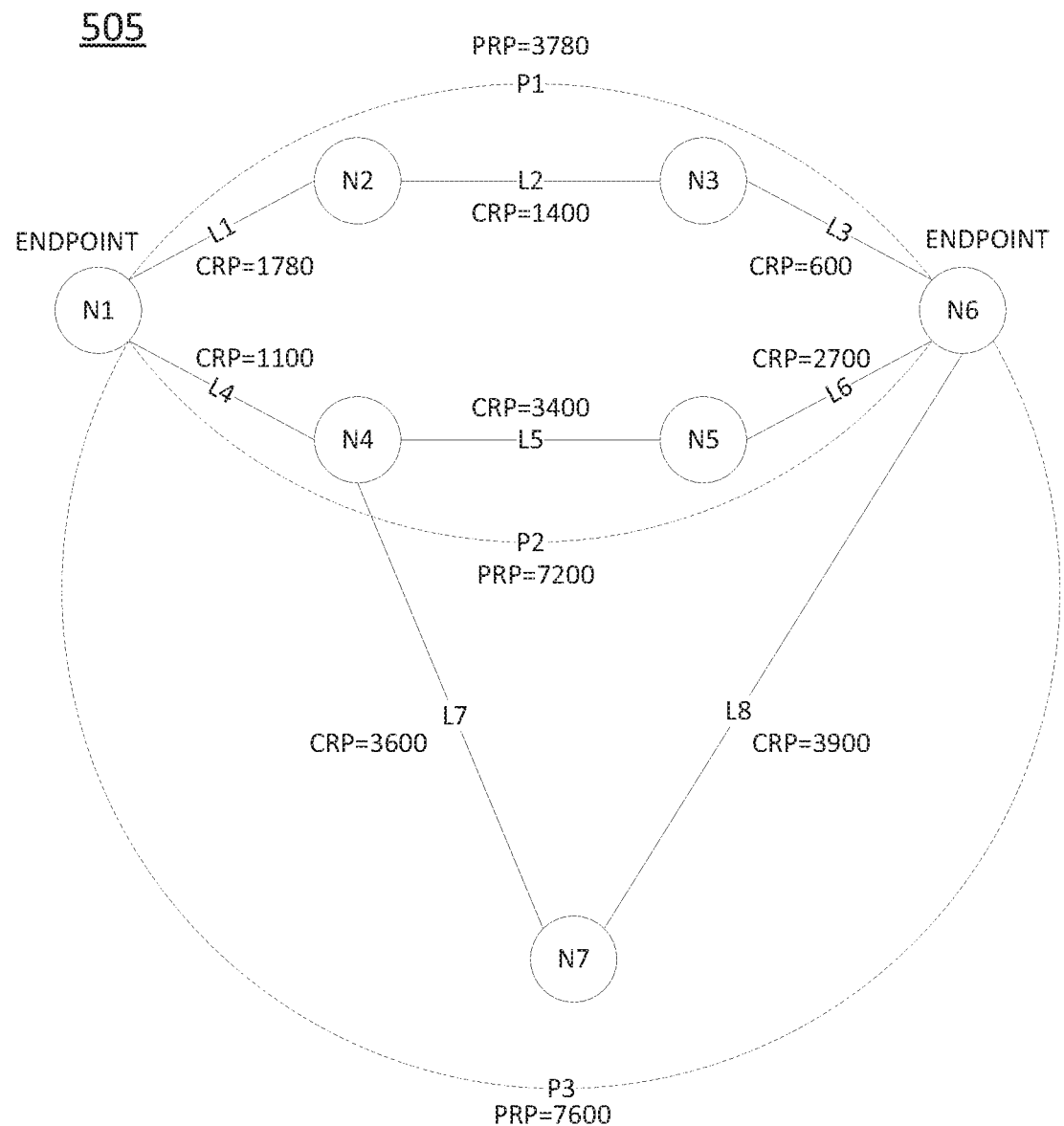

FIG. 5C illustrates a second example network topology 505 in which an example node N7 and example links L7 and L8 are added to the example network topology 500 as shown in the figure. In response to the addition of these new network components to the topology information stored in the graph database 125, the OCDE 140 determines, for the service to be routed between endpoint nodes N1 and N6, a CRP of 3600 for link L7 and a CRP of 3900 for link L8 (the CRP for the node N7 is assumed to be negligible and, thus, is omitted for clarity). In response to another query from the OCDE 140, the example graph database 125 returns path P3 as another possible path for routing traffic between the endpoint nodes N1 and N6. Path P3 includes nodes N1, N4, N7 and N6, which are interconnected by links L4, L7 and L8, as shown. The OCDE 140 further determines the PRP for path P3 to be the sum of the CRPs for links L4, L7 and L8, which is:

$$PRP_{P3} = 1100 + 3600 + 3900 = 7600 \qquad \text{Equation 7}$$

Figure 5D:
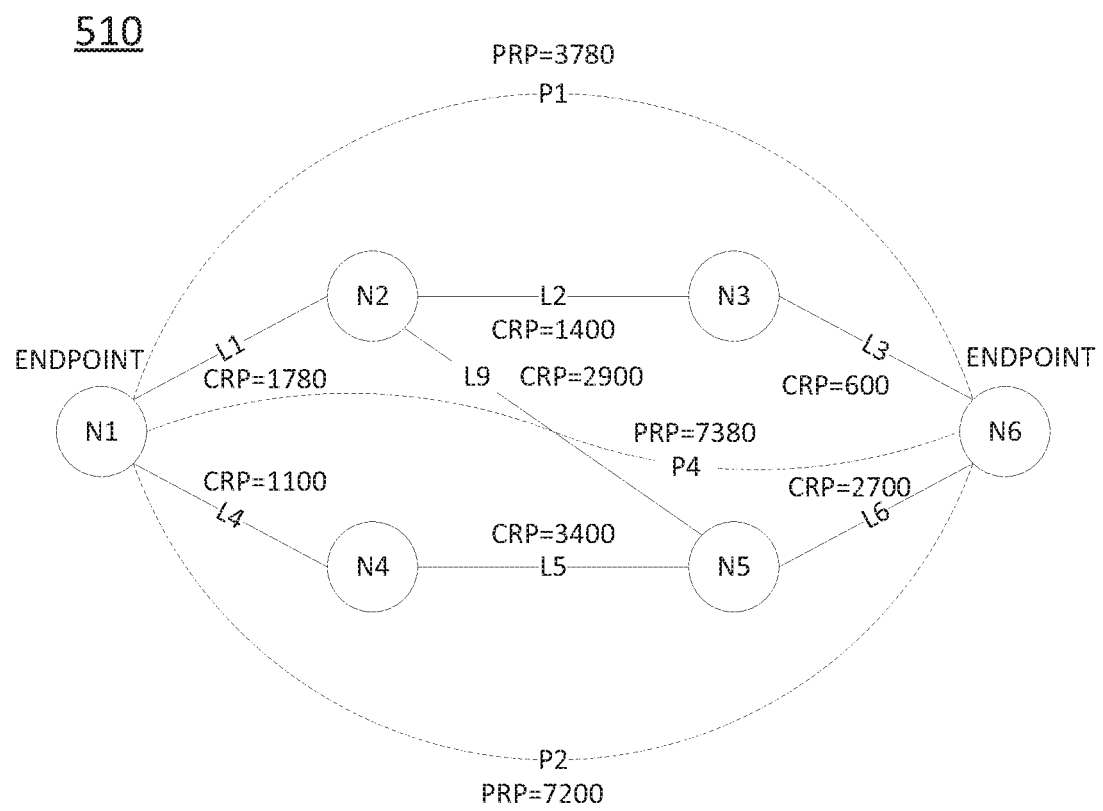

FIG. 5D illustrates a third example network topology 505 in which an example link L9 is added to the example network topology 500 to interconnect example nodes N2 and N5 as shown in the figure. In response to the addition of this new network components to the topology information stored in the graph database 125, the OCDE 140 determines, for the service to be routed between endpoint nodes N1 and N6, a CRP of 2900 for link L9. In response to another query from the OCDE 140, the example graph database 125 returns path P4 as another possible path for routing traffic between the endpoint nodes N1 and N6. Path P4 includes nodes N1, N2, N5 and N6, which are interconnected by links L1, L9 and L6, as shown. The OCDE 140 further determines the PRP for path P4 to be the sum of the CRPs for links L1, L9 and L6, which is:

$$PRP_{P4} = 1780 + 2900 + 2700 = 7380 \qquad \text{Equation 8}$$

Figure 6:
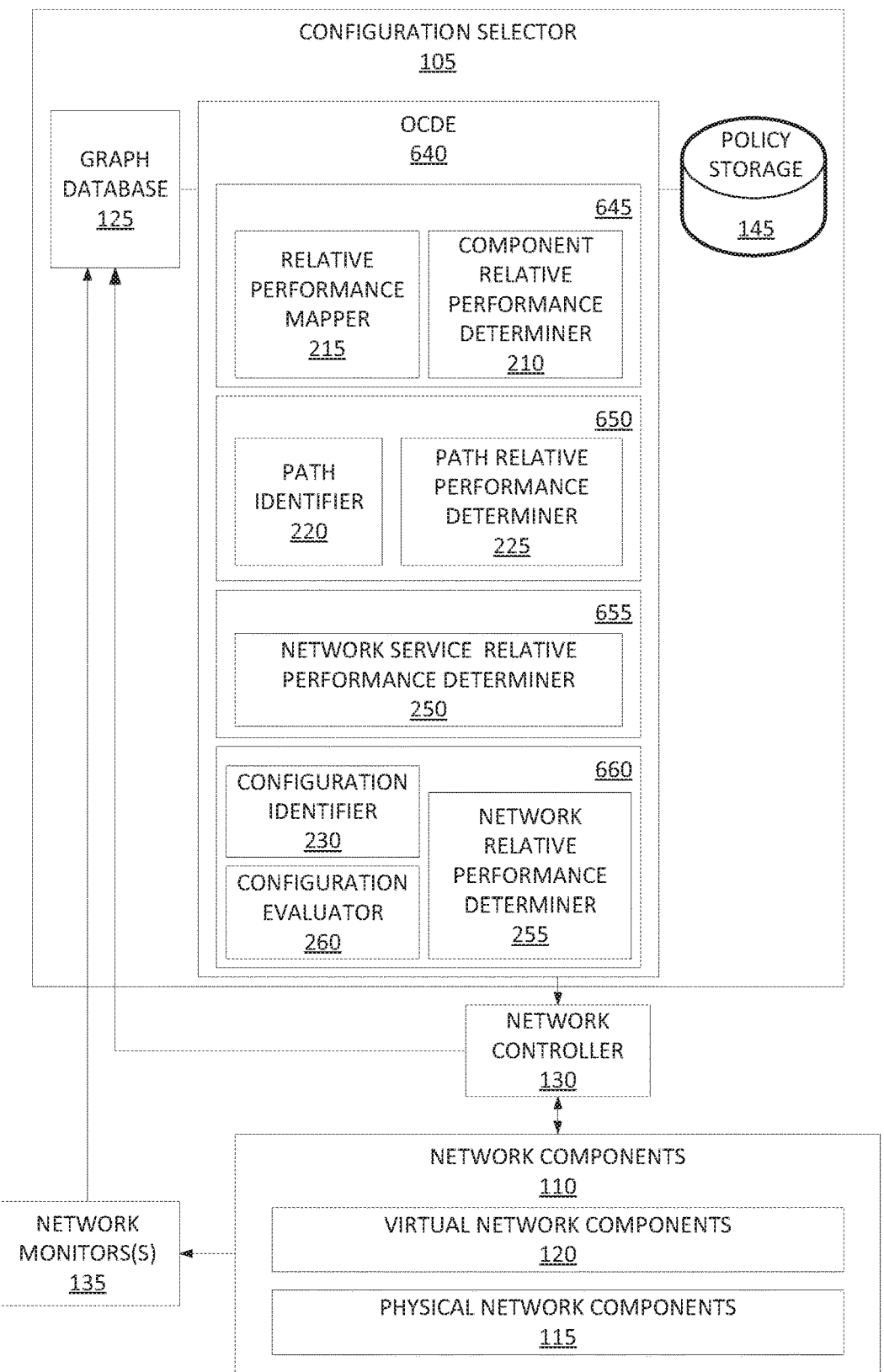
FIG. 6 illustrates an example communication network including a second example implementation of the configuration selector of FIG. 1.

FIG. 6 illustrates an example communication network 600 including a second example implementation of the configuration selector 105 of FIG. 1. The example communication network 600 of FIG. 6 includes many elements in common with the example communication network 100 of FIG. 1. As such, like elements in FIGS. 1 and 6 are labeled with the same reference numerals. The detailed descriptions of these like elements are provided above in connection with the discussion of FIG. 1 and, in the interest of brevity, are not repeated in the discussion of FIG. 6.

In the illustrated example of FIG. 6, the configuration selector 105 includes an example OCDE 640 structured to support parallel processing. More specifically, the example OCDE 640 employs different processors and/or different processing threads to, for example, determine the sets of CRP parameters for the network components 110, the respective PRP parameters for different candidate paths for routing different services in the network 600, and the respective service-specific NSRP parameters in parallel with determining the sets of NRP parameters for different proposed network configurations. In this way, the OCDE 640 can continuously update (e.g., in real-time) the topology information in the network 600 as, for example, network components 110 are added/removed, and/or the performance measurements for network components 110 change.

For example, the OCDE 640 of FIG. 6 includes at least four example processors 645, 650, 655, and 660 (or at least four example processing threads 645, 650, 655, and 660) which operate in parallel. In the illustrated example of FIG. 6, the processor 645 implements the example CRP determiner 210 and the example relative performance mapper 215 to determine sets of CRP parameters for the network components 110. The example processor 650 implements the example path identifier 220 and the example PRP determiner 225 to determine service-specific PRP parameters for candidate paths identified in the network 600. The example processor 655 implements the example NSRP determiner 250 to determine NSRP parameters for each service supported by the network 600. The example processor 660 implements the example configuration identifier 230, the example NRP determiner 255, and the example configuration evaluator 260 to determine NRP parameters for proposed configurations of the network 600 and to select, based on the NRP parameters, a configuration (e.g., current or proposed) for the network 600. In some examples, the OCDE 640 includes further processors (and/or processing threads) to allow multiple instances of, for example, the example CRP determiner 210 to be executed to determine CRP parameters for different services in parallel. Additionally or alternatively, in some examples, the OCDE 640 includes further processors (and/or processing threads) to allow multiple instances of, for example, the example PRP determiner 225 to be executed to determine PRP parameters for different candidate paths in parallel. Additionally or alternatively, in some examples, the OCDE 640 includes further processors (and/or processing threads) to allow multiple instances of, for example, the example NSRP determiner 250 to be executed to determine NSRP parameters for different services in parallel. Additionally or alternatively, in some examples, the OCDE 640 includes further processors (and/or processing threads) to allow multiple instances of, for example, the example NRP determiner 255 to be executed to determine NRP parameters for different network configurations in parallel. The example processor 645, 650, 655, and/or 660 may be implemented by any number(s), type(s) and/or combination(s) of processors, such as the example processor 802 of FIG. 8, which is described in further detail below.

While example manners of implementing the example configuration selector 105 is illustrated in FIGS. 1-6, one or more of the elements, processes and/or devices illustrated in FIGS. 1-6 may be combined, divided, re-arranged, omitted, eliminated and/or implemented in any other way. Further, the example network components 110, the example graph database 125, the example network controller(s) 130, the example network monitor(s) 135, the example OCDEs 140 and/or 640, the example policy storage 145, the example graph database interface 205, the example CRP determiner 210, the example relative performance mapper 215, the example path identifier 220, the example PRP determiner 225, the example ZNSRP determiner 250, the example configuration identifier 230, the example NRP determiner 255, the example configuration evaluator 260, the example processors 645, 650, 655, and/or 660, and/or, more generally, the example configuration selector 105 of FIGS. 1-6 may be implemented by hardware, software, firmware and/or any combination of hardware, software and/or firmware. Thus, for example, any of the example network components 110, the example graph database 125, the example network controller(s) 130, the example network monitor(s) 135, the example OCDEs 140 and/or 640, the example policy storage 145, the example graph database interface 205, the example CRP determiner 210, the example relative performance mapper 215, the example path identifier 220, the example PRP determiner 225, the example ZNSRP determiner 250, the example configuration identifier 230, the example NRP determiner 255, the example configuration evaluator 260, the example processors 645, 650, 655, and/or 660, and/or, more generally, the example configuration selector 105 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example configuration selector 105, the example network components 110, the example graph database 125, the example network controller(s) 130, the example network monitor(s) 135, the example OCDEs 140 and/or 640, the example policy storage 145, the example graph database interface 205, the example CRP determiner 210, the example relative performance mapper 215, the example path identifier 220, the example PRP determiner 225, the example ZNSRP determiner 250, the example configuration identifier 230, the example NRP determiner 255, the example configuration evaluator 260, the example processors 645, 650, 655, and/or 660 is/are hereby expressly defined to include a tangible computer readable storage device or storage disk such as a memory, a digital versatile disk (DVD), a compact disk (CD), a Blu-ray disk, etc. storing the software and/or firmware. Further still, the example configuration selector 105 may include one or more elements, processes and/or devices in addition to, or instead of, those illustrated in FIGS. 1-6, and/or may include more than one of any or all of the illustrated elements, processes and devices.

In further examples, machine readable instructions may implement the example configuration selector 105, the example network components 110, the example graph database 125, the example network controller(s) 130, the example network monitor(s) 135, the example OCDEs 140 and/or 640, the example policy storage 145, the example graph database interface 205, the example CRP determiner 210, the example relative performance mapper 215, the example path identifier 220, the example PRP determiner 225, the example ZNSRP determiner 250, the example configuration identifier 230, the example NRP determiner 255, the example configuration evaluator 260, the example processors 645, 650, 655, and/or 660. In this example, the machine readable instructions comprise one or more programs for execution by a processor, such as the processor 802 shown in the example processor platform 800 discussed below in connection with FIG. 8. The one or more programs, or portion(s) thereof, may be embodied in software stored on a tangible computer readable storage medium such as a CD-ROM, a floppy disk, a hard drive, a digital versatile disk (DVD), a Blu-ray Disk™, a memory associated with the processor 802, but the entire program or programs and/or portions thereof could alternatively be executed by a device other than the processor 802 and/or embodied in firmware or dedicated hardware (e.g., implemented by an ASIC, a PLD, an FPLD, discrete logic, etc.).

As mentioned above, the example configuration selector 105, the example network components 110, the example graph database 125, the example network controller(s) 130, the example network monitor(s) 135, the example OCDEs 140 and/or 640, the example policy storage 145, the example graph database interface 205, the example CRP determiner 210, the example relative performance mapper 215, the example path identifier 220, the example PRP determiner 225, the example ZNSRP determiner 250, the example configuration identifier 230, the example NRP determiner 255, the example configuration evaluator 260, the example processors 645, 650, 655, and/or 660 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably.

Additionally or alternatively, the example configuration selector 105, the example network components 110, the example graph database 125, the example network controller(s) 130, the example network monitor(s) 135, the example OCDEs 140 and/or 640, the example policy storage 145, the example graph database interface 205, the example CRP determiner 210, the example relative performance mapper 215, the example path identifier 220, the example PRP determiner 225, the example ZNSRP determiner 250, the example configuration identifier 230, the example NRP determiner 255, the example configuration evaluator 260, the example processors 645, 650, 655, and/or 660 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

Figure 7:
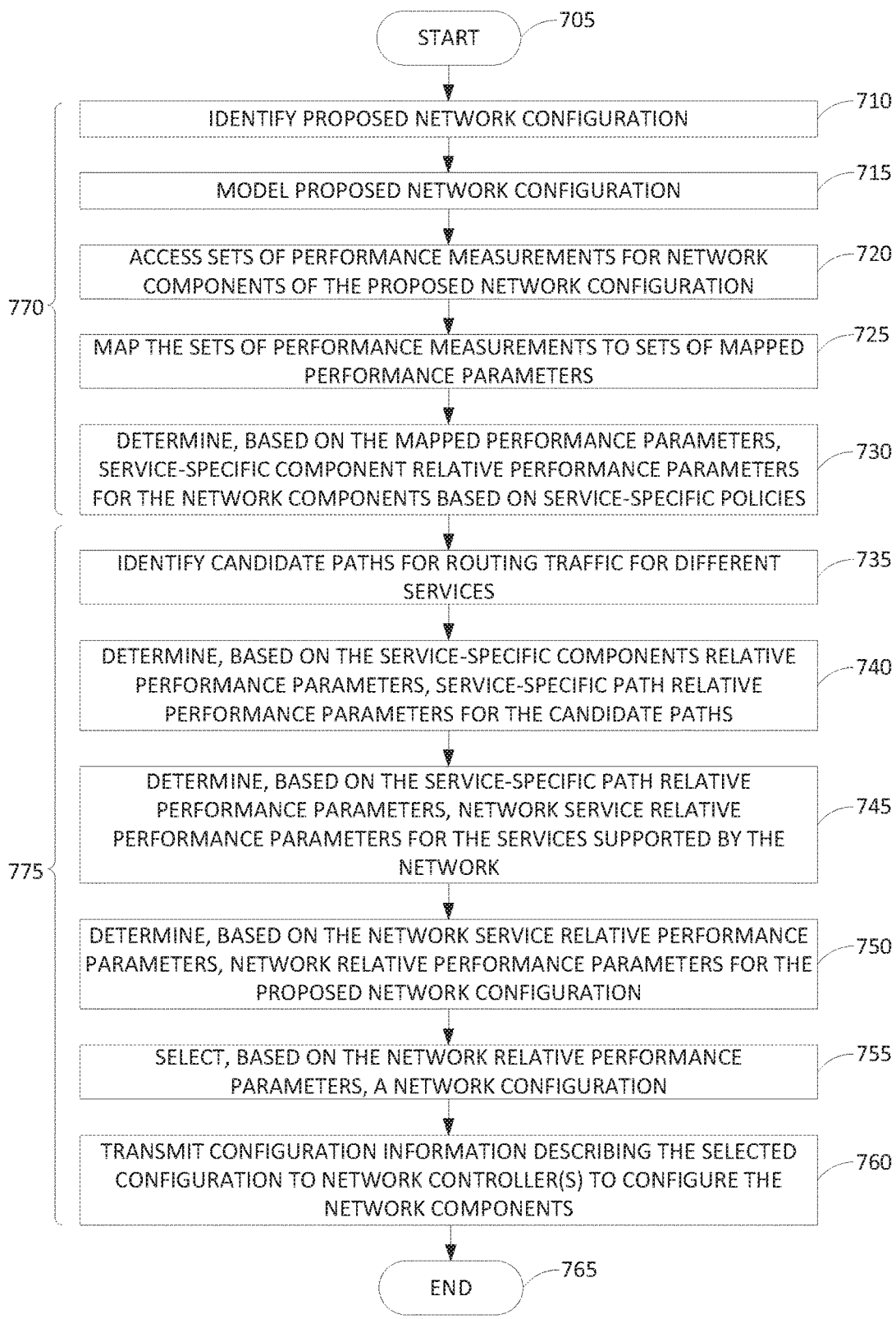
FIG. 7 is a flowchart illustrating an example program that may be executed to implement the example configuration selector of FIGS. 1-6.

FIG. 7 is a flowchart illustrating an example program 700 that may be executed to implement the example configuration selector 105 of FIGS. 1-6. With reference to the preceding figures and associated written descriptions, the example program 700 of FIG. 7 begins execution at block 705 and proceeds to block 710, at which the example OCDE 140 of the configuration selector 105 identifies a proposed network configuration. In one example, the proposed network configuration is identified using the configuration identifier 230 of the example OCDE 140 and represents an incremental change to the current network configuration.

At block 715, the example OCDE 140 models, e.g., via the configuration identifier 230, the proposed network configuration in real time, for instance using a virtual network model.

At block 720, the example OCDE 140 queries the example graph database 125 of the configuration selector 105 to access respective sets of performance measurements for the network components 110 included in the network 100 under the proposed configuration.

At block 725, the OCDE 140 maps the sets of performance measurements accessed at block 705 to corresponding sets of mapped performance parameters, as described above.

At block 730, the OCDE 140 determines (e.g., according to Equation 1, as described above) respective sets of service specific CRP parameters for the network components 110 based on the sets of mapped performance parameters determined at block 725 and the service specific policies accessed from the example policy storage 145 of the configuration selector 105. At block 735, the OCDE 140 queries the graph database 125 to identify one or more sets of candidate paths capable of routing traffic for one or more services between one or more pairs of endpoints in the network 100.

At block 740, the OCDE 140 determines (e.g., according to Equation 2, as described above) respective service specific PRP parameters for the identified candidate paths based on the service specific CRP parameters determined at block 730 for the network components 110.

At block 745, the OCDE 140 determines (e.g., according to Equation 3, as described above) network service relative performance parameters for the services supported by the network, based on the service specific PRP parameters determined at block 740. At block 750, the OCDE 140 determines (e.g., according to Equation 4, as described above) network relative performance parameters for the proposed network configuration, based on the service specific NSRP parameters determined at block 745.

At block 755, the example OCDE 140 selects, based on the NRP parameters determined at block 750, the optimal configuration for the network 100. In one example, the optimal configuration is whichever of the current configuration and the proposed configuration has the higher-value NRP parameters.

At block 760, the OCDE 140 transmits configuration information describing the selected configuration to, for example, the network controller(s) 130 to enable the network components 110 to be arranged according to the selected network configuration. The method 700 then ends in block 765.

In the illustrated example of FIG. 7, the example program 700 is depicted as being executed sequentially. However, execution of the example program 700 is not limited thereto. For example, the program 700 supports parallel execution by two or more parallel processing threads. For example, the processing at one or more of blocks 705-730 may be performed by a first example processing thread 770, whereas the processing at one or more of blocks 735-765 may be performed by a second example processing thread 775 executing in parallel with the first processing thread 770. Such an example implementation permits processing related to determining the sets of service specific CRP parameters for the network components 110 and processing related to determining the service specific PRP parameters for the candidate paths to be performed in parallel. Other parallel processing arrangements, such as those described above in connection with FIG. 6, are supported by the example program 700 of FIG. 7. For instance, additional separate processing threads could be established to support determination of the NSRP and/or NRP parameters in parallel with the CRP and PRP parameters.

Figure 8:
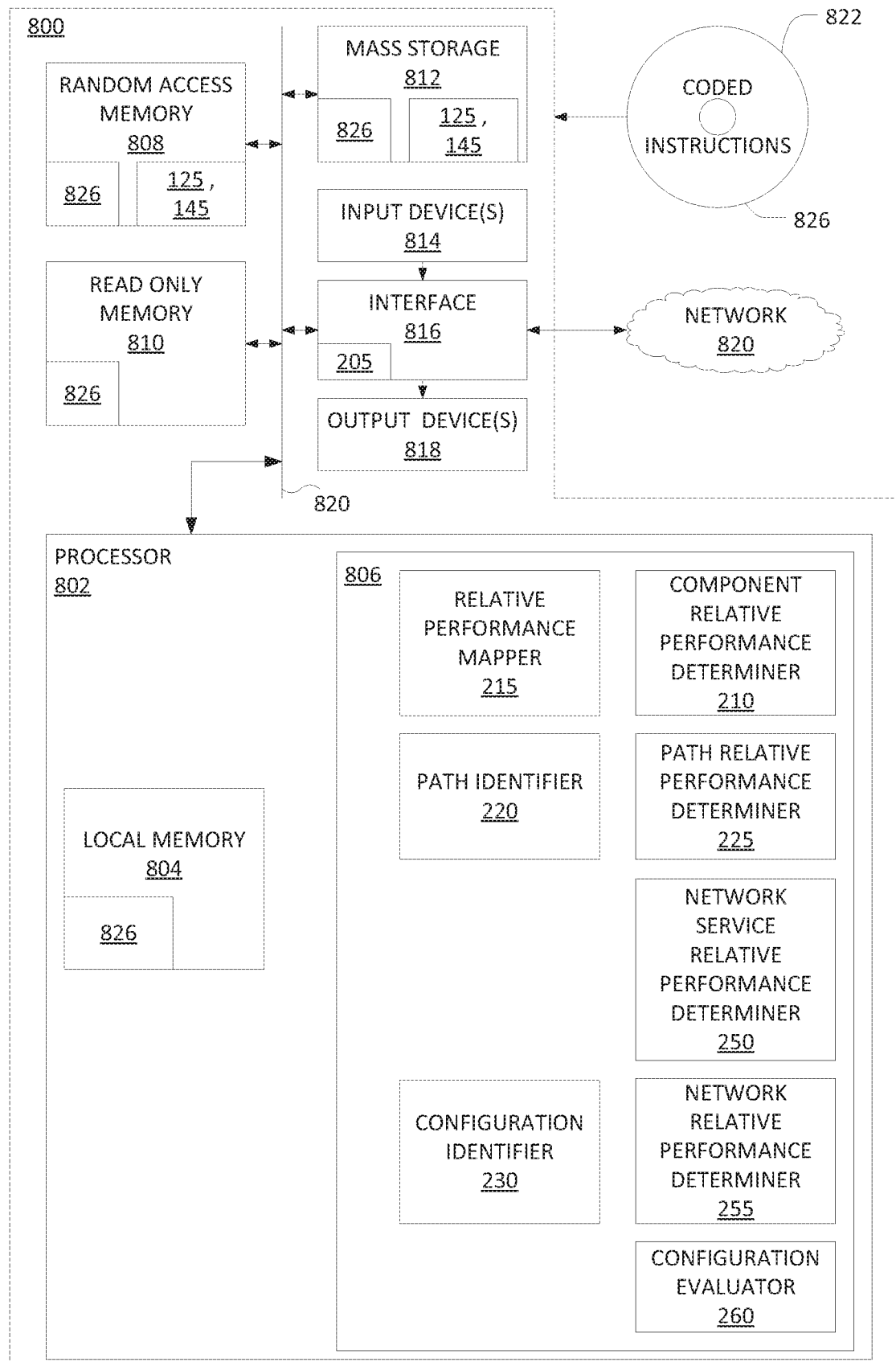
FIG. 8 is a block diagram of an example processor platform capable of executing the instructions of FIG. 6 to implement the example configuration selector of FIGS. 1-6.

FIG. 8 is a block diagram of an example processor platform 800 capable of executing the instructions of FIG. 6 to implement the example configuration selector 105 of FIGS. 1-6. The processor platform 800 can be, for example, a server, a personal computer, a mobile device (e.g., a cell phone, a smart phone, a tablet computer), a personal digital assistant (PDA), an Internet appliance, or any other type of computing device.

The processor platform 800 of the illustrated example includes a processor 802. The processor 802 of the illustrated example is hardware. For example, the processor 802 can be implemented by one or more integrated circuits, logic circuits, microprocessors or controllers from any desired family or manufacturer. In the illustrated example of FIG. 8, the processor 802 includes one or more example processing cores 806 configured via example instructions 826, which include the example instructions of FIG. 6 to implement the example CRP determiner 210, the example relative performance mapper 215, the example path identifier 220, the example PRP determiner 225, the example NSRP determiner 250, the example configuration identifier 230, the example NRP determiner 255, or the example configuration evaluator 260 of FIG. 2.

The processor 802 of the illustrated example includes a local memory 804 (e.g., a cache). The processor 802 of the illustrated example is in communication with a main memory including a volatile memory 808 and a non-volatile memory 810 via a link 820. The link 820 may be implemented by a bus, one or more point-to-point connections, etc., or a combination thereof. The volatile memory 808 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 810 may be implemented by flash memory and/or any other desired type of memory device. Access to the main memory 808, 810 is controlled by a memory controller.

The processor platform 800 of the illustrated example also includes an interface circuit 816. The interface circuit 816 may be implemented by any type of interface standard, such as an Ethernet interface, a universal serial bus (USB), and/or a PCI express interface.

In the illustrated example, one or more input devices 814 are connected to the interface circuit 816. The input device(s) 814 permit(s) a user to enter data and commands into the processor 802. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 800, can allow the user to control the computer system and provide data to the computer using physical gestures, such as, but not limited to, hand or body movements, facial expressions, and face recognition.

One or more output devices 818 are also connected to the interface circuit 816 of the illustrated example. The output devices 818 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 816 of the illustrated example also includes a communication device such as a transmitter, a receiver, a transceiver, a modem and/or network interface card to facilitate exchange of data with external machines (e.g., computing devices of any kind) via a network 820 (e.g., an Ethernet connection, a digital subscriber line (DSL), a telephone line, coaxial cable, a cellular telephone system, etc.). In the illustrated example of FIG. 8, the interface circuit 816 is also structured to implement the example graph database interface 205.

The processor platform 800 of the illustrated example also includes one or more mass storage devices 812 for storing software and/or data. Examples of such mass storage devices 812 include floppy disk drives, hard drive disks, compact disk drives, Blu-ray disk drives, RAID (redundant array of independent disks) systems, and digital versatile disk (DVD) drives. In some examples, the mass storage device 812 may implement the example graph database 125 and/or the example policy storage 145. Additionally or alternatively, in some examples the volatile memory 808 may implement the example graph database 125 and/or the example service profile storage 145.

Coded instructions 826 corresponding to the instructions of FIG. 6 may be stored in the mass storage device 812, in the volatile memory 808, in the non-volatile memory 810, in the local memory 804 and/or on a removable tangible computer readable storage medium, such as a CD or DVD 822.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method comprising:
   determining, by a processor, a first network relative performance parameter for a current configuration of a network, based on respective weighting profiles associated with a plurality of services for which the network carries data;
   determining, by the processor, a second network relative performance parameter for a proposed configuration of the network, based on the respective weighting profiles associated with the plurality of services for which the network carries data, wherein the determining the second network relative performance parameter comprises:
      modeling the proposed configuration of the network;
      weighting additional respective network service relative performance parameters for the plurality of services under the proposed configuration as modeled according to the respective weighting profiles to produce a second plurality of weighted network service relative performance parameters; and
      combining the second plurality of weighted network service relative performance parameters to produce the second network relative performance parameter; and
   implementing, by the processor, the proposed configuration in the network when the second network relative performance parameter is greater than the first network relative performance parameter.

2. The method of claim 1, wherein the determining the first network relative performance parameter for the current configuration of the network comprises:
   weighting respective network service relative performance parameters for the plurality of services under the current configuration according to the respective weighting profiles to produce a plurality of weighted network service relative performance parameters; and
   combining the plurality of weighted network service relative performance parameters to produce the first network relative performance parameter.

3. The method of claim 1, wherein each network service relative performance parameter of a plurality of network service relative performance parameters is computed for a given service of the plurality of services by:
   determining respective component performance parameters for the network components of the network under the current configuration based on a respective weighting profile associated with the given service;
   determining, based on the respective component performance parameters, respective path performance parameters for a plurality of candidate paths between two endpoints served by the given service; and
   combining the respective path performance parameters to produce the each network service relative performance parameter.

4. The method of claim 1, wherein each additional network service relative performance parameter of the additional network service relative performance parameters is computed for a given service of the plurality of services by:
   determining respective component performance parameters for the network components of the network under the proposed configuration as modeled based on a respective weighting profile associated with the given service;
   determining, based on the respective component performance parameters, respective path performance parameters for a plurality of candidate paths between two endpoints served by the given service; and
   combining the respective path performance parameters to produce the each additional network service relative performance parameter.

5. The method of claim 1, wherein the modeling is performed using a virtual network model.

6. The method of claim 1, wherein the implementing comprises:
   transmitting information describing the proposed configuration to a network controller that configures the network components of the network.

7. The method of claim 1, wherein the respective weighting profiles each reflect a relative importance of a respective one of the plurality of services.

8. The method of claim 1, wherein the respective weighting profiles reflect constraints on the network.

9. The method of claim 1, wherein the respective weighting profiles reflect goals to be met by the network.

10. The method of claim 1, wherein the proposed configuration is defined according to a pre-defined method.

11. A non-transitory computer-readable storage device storing a plurality of instructions which, when executed by a processor, cause the processor to perform operations, the operations comprising:
   determining a first network relative performance parameter for a current configuration of a network, based on respective weighting profiles associated with a plurality of services for which the network carries data;
   determining a second network relative performance parameter for a proposed configuration of the network, based on the respective weighting profiles associated with the plurality of services for which the network carries, wherein the determining the second network relative performance parameter comprises:
   modeling the proposed configuration of the network;
   weighting additional respective network service relative performance parameters for the plurality of services under the proposed configuration as modeled according to the respective weighting profiles to produce a second plurality of weighted network service relative performance parameters; and
   combining the second plurality of weighted network service relative performance parameters to produce the second network relative performance parameter; and
   implementing the proposed configuration in the network when the second network relative performance parameter is greater than the first network relative performance parameter.

12. The non-transitory computer-readable storage device of claim 11, wherein the determining the first network relative performance parameter comprises:
   weighting respective network service relative performance parameters for the plurality of services under the current configuration according to the respective weighting profiles to produce a plurality of weighted network service relative performance parameters; and
   combining the plurality of weighted network service relative performance parameters to produce the first network relative performance parameter.

13. The non-transitory computer-readable storage device of claim 11, wherein each network service relative performance parameter of a plurality of network service relative performance parameters is computed for a given service of the plurality of services by:
   determining respective component performance parameters for the network components of the network under the current configuration based on a respective weighting profile associated with the given service;
   determining, based on the respective component performance parameters, respective path performance parameters for a plurality of candidate paths between two endpoints served by the given service; and
   combining the respective path performance parameters to produce the each network service relative performance parameter.

14. The non-transitory computer-readable storage device of claim 11, wherein each additional network service relative performance parameter of the additional network service relative performance parameters is computed for a given service of the plurality of services by:
   determining respective component performance parameters for the network components of the network under the proposed configuration as modeled based on a respective weighting profile associated with the given service;
   determining, based on the respective component performance parameters, respective path performance parameters for a plurality of candidate paths between two endpoints served by the given service; and
   combining the respective path performance parameters to produce the each additional network service relative performance parameter.

15. The non-transitory computer-readable storage device of claim 11, wherein the modeling is performed using a virtual network model.

16. The non-transitory computer-readable storage device of claim 11, wherein the implementing comprises:
   transmitting information describing the proposed configuration to a network controller that configures the network components of the network.

17. The non-transitory computer-readable storage device of claim 11, wherein the respective weighting profiles each reflect a relative importance of a respective one of the plurality of services.

18. An apparatus comprising:
   a processor; and
   a computer-readable storage device storing a plurality of instructions which, when executed by the processor, cause the processor to perform operations, the operations comprising:
   determining a first network relative performance parameter for a current configuration of a network, based on respective weighting profiles associated with a plurality of services for which the network carries data;
   determining a second network relative performance parameter for a proposed configuration of the network, based on the respective weighting profiles associated with the plurality of services for which the network carries data, wherein the determining the second network relative performance parameter comprises:
   modeling the proposed configuration of the network;
   weighting additional respective network service relative performance parameters for the plurality of services under the proposed configuration as modeled according to the respective weighting profiles to produce a second plurality of weighted network service relative performance parameters; and
   combining the second plurality of weighted network service relative performance parameters to produce the second network relative performance parameter; and
   implementing the proposed configuration in the network when the second network relative performance parameter is greater than the first network relative performance parameter.

19. The apparatus of claim 18, wherein the determining the first network relative performance parameter comprises:
   weighting respective network service relative performance parameters for the plurality of services under the current configuration according to the respective weighting profiles to produce a plurality of weighted network service relative performance parameters; and combining the plurality of weighted network service relative performance parameters to produce the first network relative performance parameter.

20. The apparatus of claim 18, wherein each network service relative performance parameter of a plurality of network service relative performance parameters is computed for a given service of the plurality of services by:
- determining respective component performance parameters for the network components of the network under the current configuration based on a respective weighting profile associated with the given service;
- determining, based on the respective component performance parameters, respective path performance parameters for a plurality of candidate paths between two endpoints served by the given service; and
- combining the respective path performance parameters to produce the each network service relative performance parameter.

\* \* \* \* \*